June 14, 1927.
J. A. BLADH
1,632,642
MACHINE FOR THE MANUFACTURING OF BUTTONS
Filed July 26, 1923 10 Sheets-Sheet 1
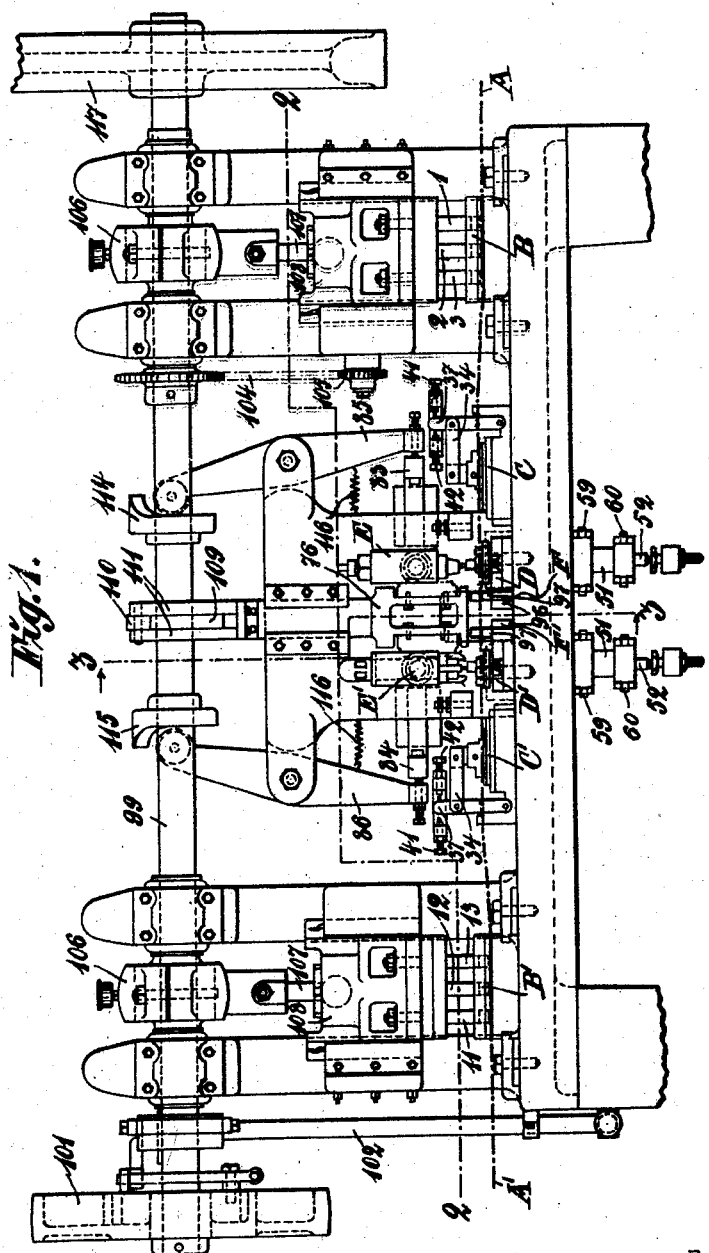
Inventor
J. A. Bladh
By Marks & Clerk
Attys.

June 14, 1927.
J. A. BLADH
1,632,642
MACHINE FOR THE MANUFACTURING OF BUTTONS
Filed July 26, 1923   10 Sheets-Sheet 2
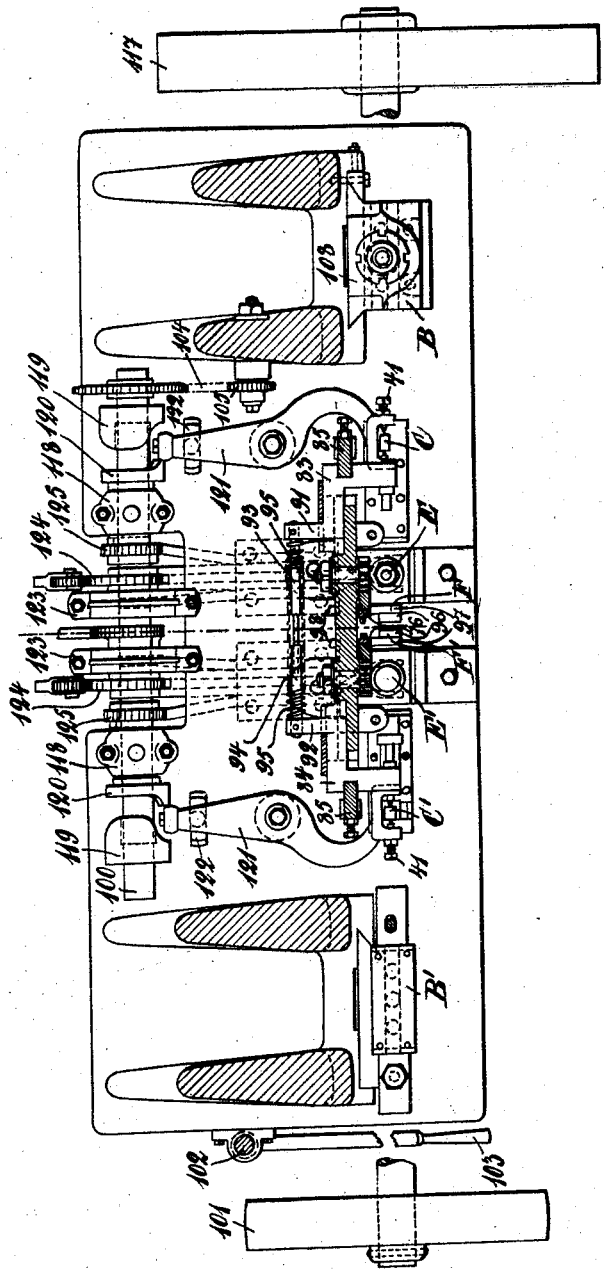
Inventor
J. A. Bladh
By Marks & Clerk
Attys.

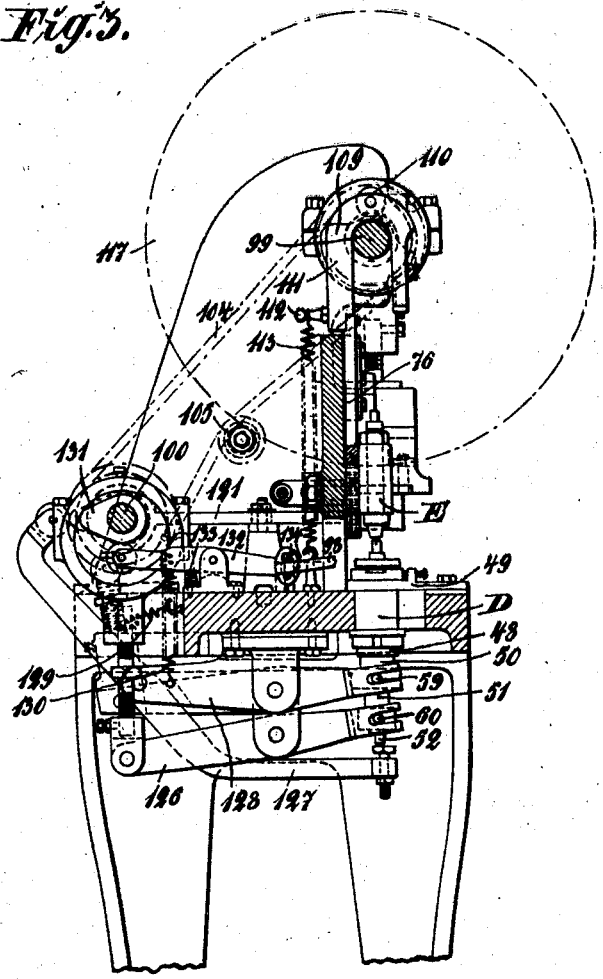

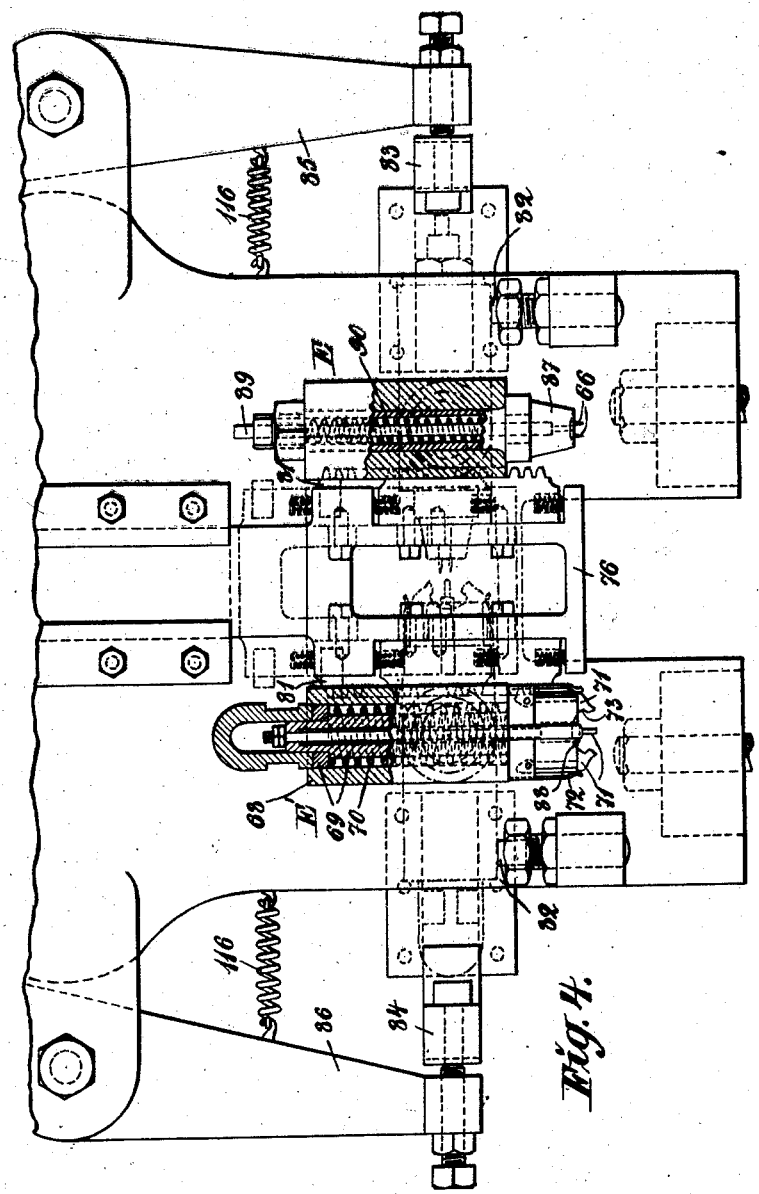

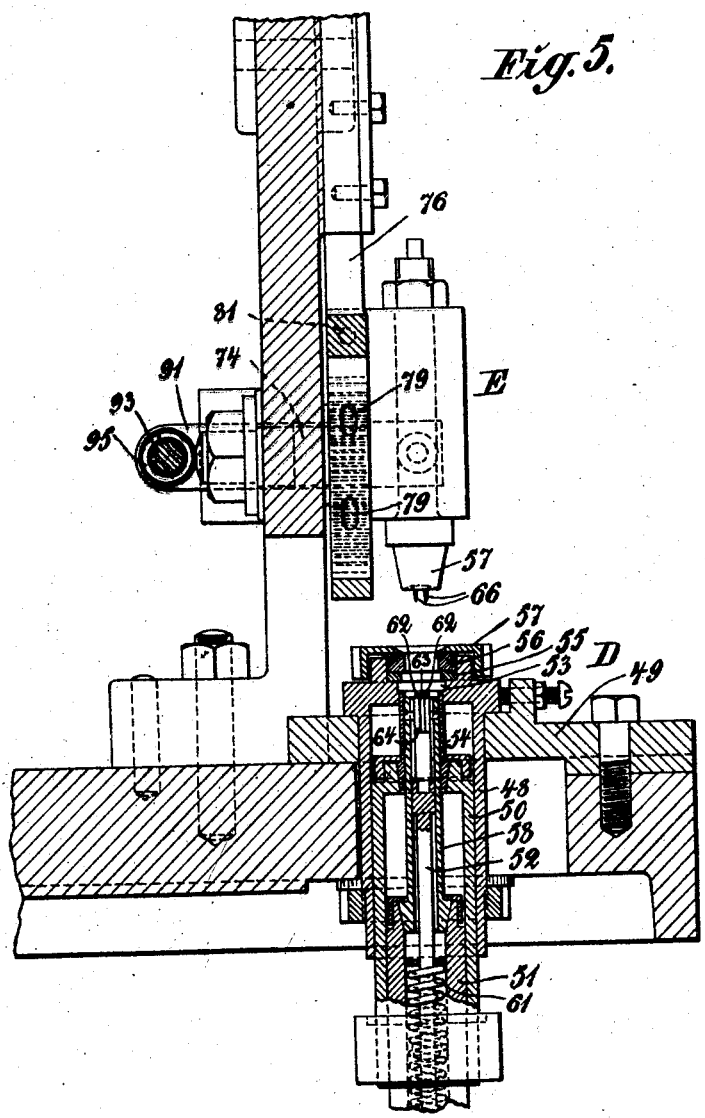

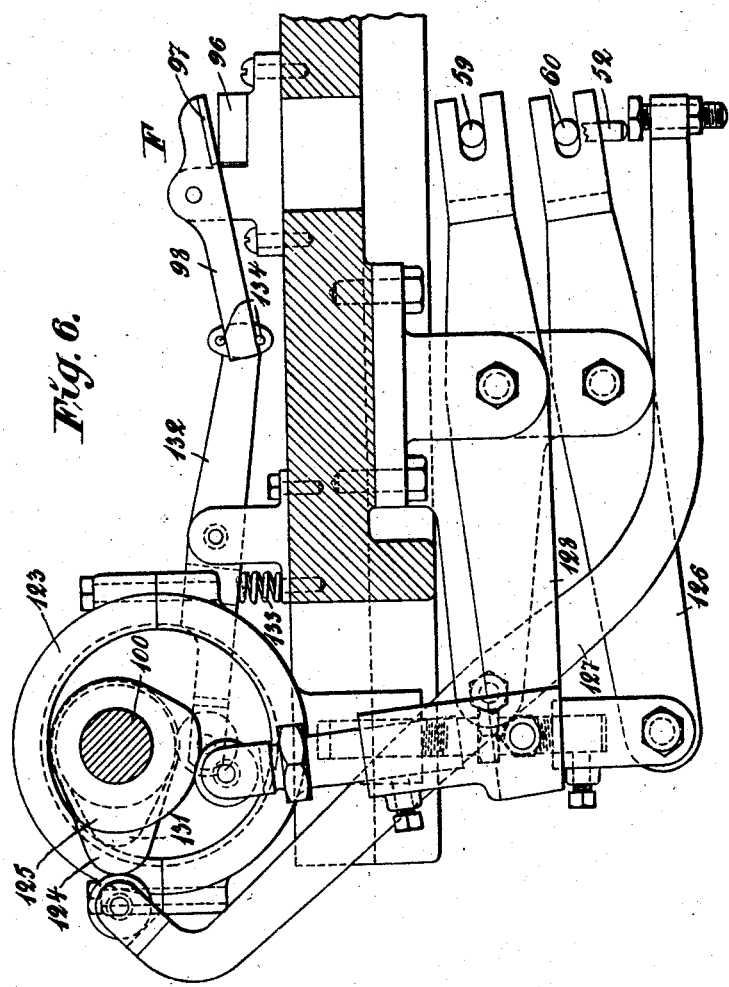

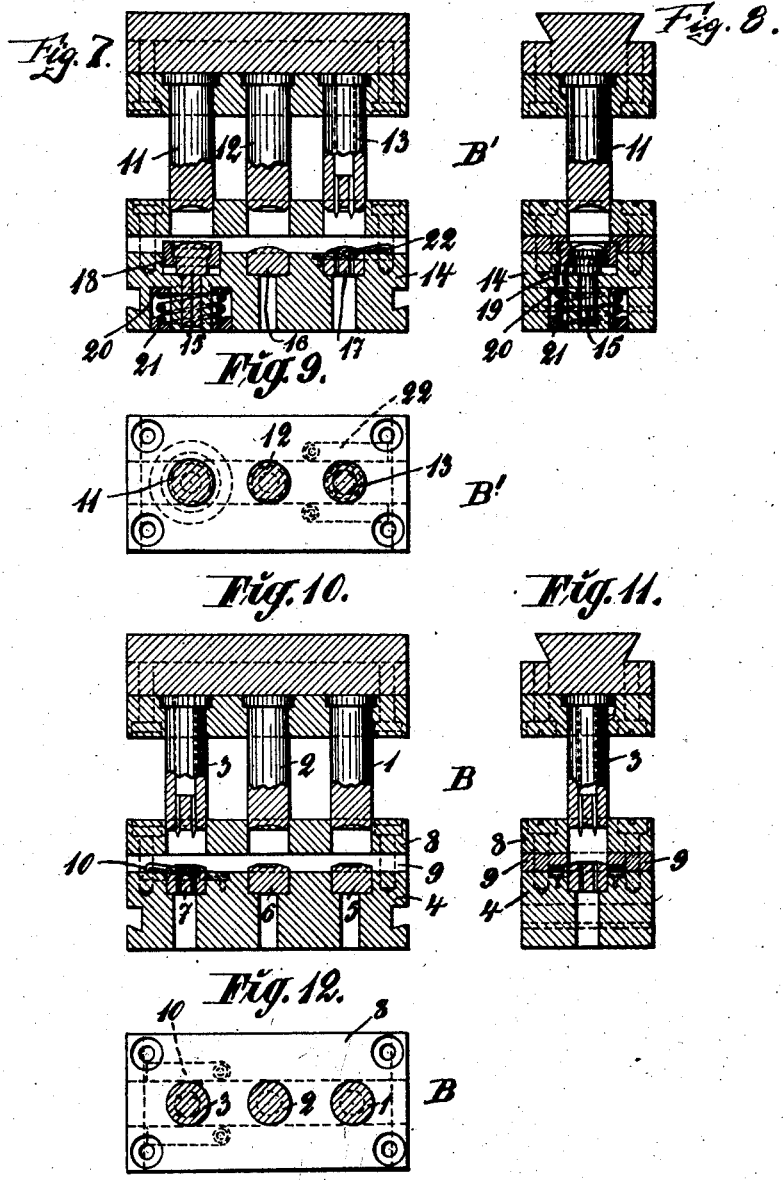

June 14, 1927.
J. A. BLADH
1,632,642
MACHINE FOR THE MANUFACTURING OF BUTTONS
Filed July 26, 1923   10 Sheets-Sheet 8
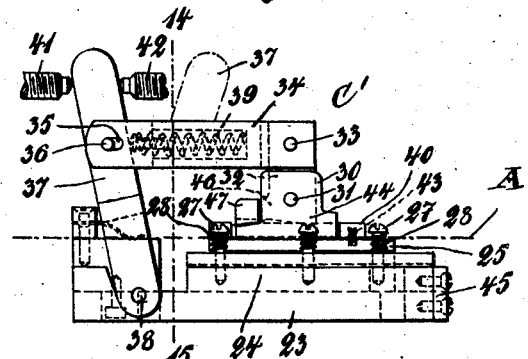
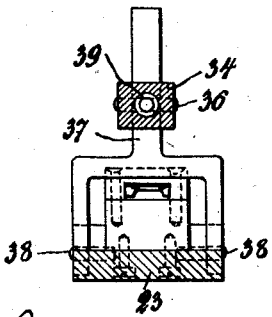 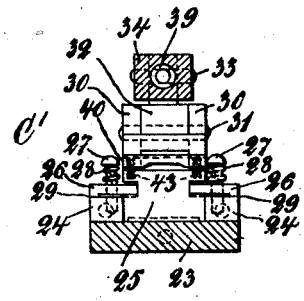
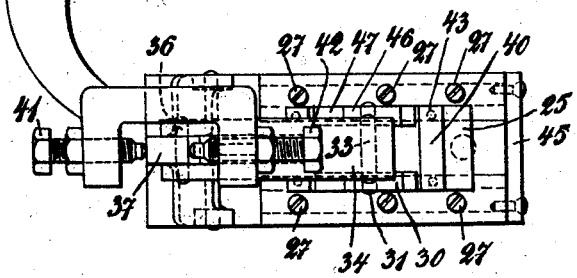
Inventor
J. A. Bladh
By Marks & Clerk
Attys.

June 14, 1927.
J. A. BLADH
1,632,642
MACHINE FOR THE MANUFACTURING OF BUTTONS
Filed July 26, 1923    10 Sheets-Sheet 9
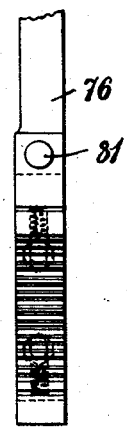
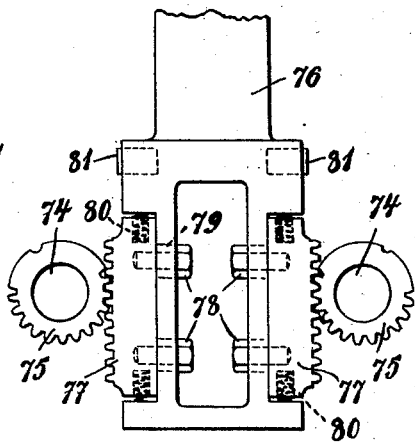
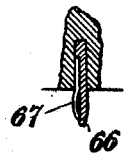
*Fig.17.*    *Fig.18.*    *Fig.21.*
*Fig.19.*   *Fig.22.*   *Fig.25.* *Fig.27.* *Fig.29.*
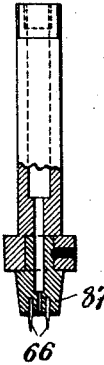
*Fig.23.*   *Fig.26.* *Fig.28.* *Fig.30.*
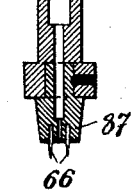
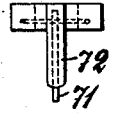
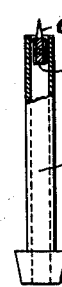
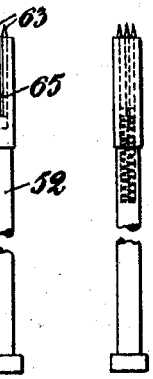
*Fig.20.*   *Fig.24.*
Inventor
J. A. Bladh
By Marks & Clerk
Attys.

June 14, 1927.
J. A. BLADH
1,632,642
MACHINE FOR THE MANUFACTURING OF BUTTONS
Filed July 26, 1923    10 Sheets-Sheet 10
*Fig. 36.*  *Fig. 37.*
 
*Fig. 31.*
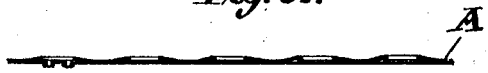
*Fig. 32.*
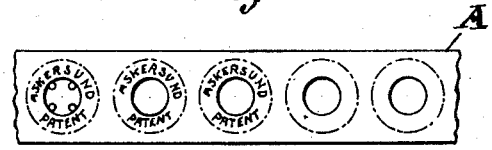
*Fig. 33.*
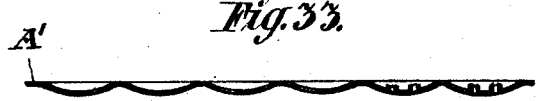
*Fig. 34.*
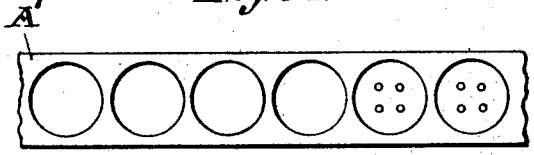
*Fig. 35.*
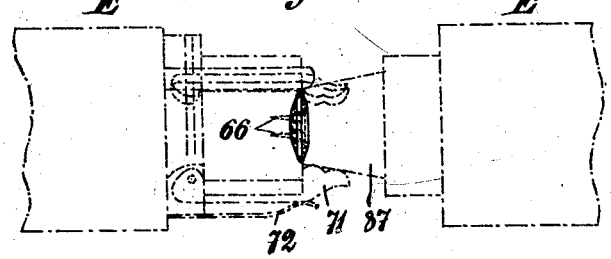
Inventor
J. A. Bladh
By Marks & Clerk
Attys.

Patented June 14, 1927.

1,632,642

UNITED STATES PATENT OFFICE.

JOHAN ALFRED BLADH, OF ASKERSUND, SWEDEN, ASSIGNOR TO AKTIEBOLAGET KNAPPFABRIKEN, OF ASKERSUND, SWEDEN.

MACHINE FOR THE MANUFACTURING OF BUTTONS.

Application filed July 26, 1923, Serial No. 654,027, and in Sweden August 2, 1922.

This invention relates to an automatic machine for the manufacture of buttons of the type in which the buttons are composed of one upper and one lower part obtained from two blanks travelling in two pathways provided with embossing devices, feeding devices and cutting devices and leading to a meeting place in the machine.

In machines of this type as hitherto suggested the machine was composed of two rotatable plates which were respectively supplied with bushes and caps from strip feeding mechanisms, which were adapted to automatically feed forward two continuous blanks or bands from which the bushes and caps were respectively punched out and severed and fed upon their respective plates, upon which plates the bushes were subsequently perforated and stamped and the caps shaped, stamped and finally passed above the bushes to be united thereto.

The present invention consists in a machine of the above type in which along the pathway for each of the two blanks there is located an embossing device such that the button parts are completely shaped in the bands, a feeding device for the band and a cutting device by which the finished button parts are severed from the band and conveyed to carriers, which carriers are so rotatably mounted and their rotary movements so adjusted, that the members of the same, which are positioned facing the bands and receive from the bands the button parts, simultaneously begin to rotate with them the button parts and stop in a position facing each other, in which position of the carriers the button parts are united the one to the other into a finished button whereafter each carrier returns to its prior position in order to receive the next button part.

A machine according to this invention is illustrated in the accompanying drawings in which Figure 1 is a front view of the machine and Figure 2 a plan of the same, partly in section on the line 2—2 in Figure 1. Figure 3 is a cross section of the machine on the line 3—3 in Figure 1. Figure 4 is a front view on an enlarged scale and partly in section of the middle portion of the machine with both the carriers. Figure 5 is a longitudinal section of that part of the machine where the upper parts of the buttons are given their final shape, and thereabove a side view of the corresponding carrier. Figure 6 is a central cross section of the machine table, showing some levers, cams, etc., adapted to impart movement to different parts of the machine. Figures 7, 8 and 9 show the embossing and piercing devices, partly in section, adapted to shape the lower part of the buttons, and Figures 10, 11 and 12 the corresponding devices, also partly in section, adapted to shape the upper part of the buttons. Figure 13 is a side view of the device for feeding the one as well as the other blank forwards. Figures 14 and 15 are cross sections of the same on the line 14—15 in Figure 13, the one figure when looking in one direction and the other in the opposite direction. Figure 16 is a plan view of the same. Figure 17 is a side view and Figure 18 a front view of the slide, by means of which both the carriers are rotated. Figures 19 to 30 show details. Figures 31 and 32 show the appearance of a blank in which the upper button parts are formed, seen in longitudinal section and in plan. Figures 33 and 34 are similar views of a blank in which the lower button parts are formed. Figure 35 is a side view of a button in the moment the both parts are united, showing in dash and dot lines the ends of both the carriers in their positions at that moment. Figures 36 and 37 are a plan view and a cross section of a finished button manufactured in the machine.

With reference to Figure 1 a blank in the shape of a band is shown in dash and dot lines in each of the pathways. A designates the blank of which the upper parts of the buttons are formed and A' the blank of which the lower parts are formed. In the path of the blank A are arranged an embossing device B, a feeding device C and a cutting device D above which latter is provided the carrier E appertaining to the same and adapted to concur in the operation of uniting the button parts. In the pathway of the blank A' are likewise arranged an embossing device B', a feeding device C' and a cutting device D' above which latter is placed the carrier E' appertaining to this latter cutting device and forming part of the device for uniting the parts of a button. In order to get rid of the remaining parts of the blanks at the same rate as the button parts are cut out of them and the perforated blank leaves the cutting devices D, D', respectively, shears F are arranged close to each of these cutting devices, that is shears for each of the blanks. As these shears are quite like each other, only one of them is, for the sake of clearness, shown in Figures 3 and 6.

In feeding forward the blank A in its pathway towards the center of the machine it passes first the embossing device B. This is provided with three plungers 1, 2 and 3 (Figures 10 to 12) placed along the pathway and of which the first 1 makes in the blank one or more recesses, ridges, etc., (Figures 31 and 32) which the upper part of the button is desired to have, the second plunger 2 makes the imprint, that is the inscription in the blank with which the button is to be provided, while the third plunger 3 is piercing the holes for sewing. As the blank after each operation obviously must be fed forward a distance corresponding exactly to the size of the button part, the plungers are placed at such a distance from each other, that the place of the blank, which has been pressed by the plunger 1, will be placed under the plunger 2. For the same reason the plunger 3 is at such a distance from the plunger 2 as is equal to the distance of this latter from the plunger 1. The pathway of the blank in the embossing device B is formed in the frame of the bottom die, which consists of a base 4, in which the bottom dies 5, 6 and 7 are fitted opposite their upper dies or plungers 1, 2 and 3, and a top-piece 8, into which the plungers extend and which at the same time acts as a guide for the same. Between the base and the top-piece is along each of their longitudinal edges placed a distance piece 9 of suitable thickness thereby forming in the frame a space which is open at both ends and which is of the same width as the blank A. The base close to the die 7 is provided with a spring 10 which during the operation of the dies is pressed down towards the base and which after the blank is pierced lifts the same so much above the die 7 that the edges projecting downwards around the holes are at such a distance above the bottom die that said edges do not interfere with the feeding forward of the blank nor will they be bent during the said feeding.

Like the embossing device B the embossing device B' (Figures 7 to 9) consists of three plungers 11, 12 and 13, which are also placed at such a distance from each other that the place of the blank which has been acted upon by a plunger will again be acted upon by the next plunger. The arrangement of this embossing device is, however, somewhat unlike the arrangement of the embossing device B, as the lower part of the button which is formed in the embossing device B' is to be rather bulged and thus must be embossed higher than the upper part of the button. In order that the blank, the width of which is only a trifle greater than the diameter of the button, may be securely kept in position at this operation, so that the edges of the blank during the operation are not drawn nearer each other a special clamping arrangement is provided in connection with the plunger 11. In the frame 14 of the bottom dies opposite the plungers are placed bottom dies 15, 16 and 17 in the same way as the embossing device B. Of these the die 15 is surrounded by a ring 18 which is displaceable in the frame and rests on a number (for instance three) of pins 19 which are displaceable in the frame and are kept in a raised position by a washer 20 and a rather powerful spring 21 acting upon the same. The upper surface of the ring 18 is level with or somewhat higher than the highest point of the die 15, so that the plunger 11 during the operation will at first press the blank hard against the ring 18. On the continued downward movement of the plunger 11 the ring is also moving downwards against the tension of the spring 21, and then the blank is firmly clamped between the outer edge of the plunger and the ring while the blank is embossed between the plunger and the die. In consequence of this clamping of the blank during the operation the edges of the blank remain substantially straight and even which is important for the feeding forward of the blank which in the feeding device may not be clamped at any embossed place but only at the edges, which for that reason must be as straight and even as possible. As at this first operation generally some small uneven portions are formed in the embossed part especially near the edge of the same and it generally is difficult to obtain in a single operation a well done comparatively high embossment, there is for a finishing operation arranged a second plunger 12, between which and the die 16 the lower part of the button obtains its final shape whereafter the sewing holes are pierced by the plunger 13. In the embossing device B', as in the device B, is provided a spring 22 for the purpose of lifting the blank so much that the downwardly projecting edges round the pierced holes come out of contact with the die 17 and do not interfere with the feeding forward of the blank.

The feeding device C for the blank A as well as the feeding device C' for the blank A' is positioned between the embossing device B, B' respectively and the cutting device D, D' respectively, in consequence whereof the blank will be pulled through its embossing device and pushed through the cutting device. Both the feeding devices being alike, the construction of only one of them will be described. The feeding device, shown in detail in Figures 13 to 16, is the one designated with C' in Figures 1 and 2 it being thus the one feeding the blank A'.

To the machine table is secured a plate 23 provided with ribs 24, between which is placed a slide 25 movable on the plate and provided with grooves into which extend guiding plates 26 which are pressed against the ribs 24 by means of screws 27 and springs 28 placed between the heads of the screws and the guiding plates. The grooves in the slide 25 are placed somewhat above the upper surfaces of the ribs 24, while each guiding plate 26 along its outer edge is provided with a shoulder 29, the height of which corresponds to the height of the grooves above the ribs 24. By more or less tightening the screws 27 the tension of the springs 28 and thus the pressure of the plates 26 against the slide may be regulated and thus the friction of this latter against the plate 23 increased or decreased. The slide 25 is provided with two upwardly extending ears 30 supporting a pin 31 upon which is movably mounted a bell crank lever having an upwardly extending arm 32, to which is connected by means of a pin 33 the one end of a link 34. The other end of this latter is provided with a slot 35 for a pin 36 by means of which the link is connected to a forked lever 37, having the forked end, which is turned downwards, rotatably mounted on pins 38 projecting from the plate 23. The link 34 is provided with a recess wherein is placed a spring 39, the one end of which rests against the bottom of the recess while its other end acts with a certain pressure upon the lever 37 in order that the pin 36 may take the position in the slot 35, shown in Figure 13, when the lever 37 is not actuated.

Between the ears 30 and on the top of the slide 25 is placed a plate 40 the underside of which is in the center provided with a longitudinal groove or channel, the size of which is adapted for the passage of the embossments in the blank, which is placed between the plate 40 and the upper side of the slide and which during the movement of the slide in the feeding direction is clamped by the plate 40 against the slide only at its edges, but which during the return movement of the slide is free in order that the blank may not be displaced during the return movement of the slide. The slide 25 is shifted by means of a lever the end of which is movable in the direction of movement of the slide and has the shape of a fork the jaws of which carry each an adjusting screw 41, 42, respectively, the one of which by its end acts against the one and the other screw against the opposite side of the lever 37 so that this latter will be moved by the screws from the one to the other of its end positions, which are shown in Figure 13 the one with full lines and the other with dash and dot lines. In the position shown with full lines the plate 40 is kept lifted from the slide and the blank A' by small springs 43 placed in each corner of the plate between the same and the slide. When the lever 37 is actuated by the screw 41 in order to feed the blank forwards, the arm 32 of the bell crank lever is turned on the pin 31 by means of the link 34, and then the lower corner 44 of the arm, which rests against the plate 40, presses this latter downwards against the blank thereby clamping the same against the slide and at the same time compressing the small springs 43 which normally keep the plate 40 lifted. In order that the slide 25 at the moment the blank is clamped may not be displaced and commence to feed the blank before it has been quite firmly clamped the pressure of the guiding plates 26 against the slide is so adjusted that a certain amount of pressure must act on the blank in order to overcome the friction, which in consequence of the pressure of the plates 26 arises at the displacement of the slide. Not until a definite pressure has been exerted by the link 34 will the blank be firmly clamped and the slide displaced, to feed the blank forward. As the thickness of this latter may, however, vary somewhat it is evident, that a blank of increased thickness will be clamped somewhat earlier and a blank of less thickness somewhat later than a blank of normal thickness. As however the blank is clamped during the first period of movement of the mechanism which during the continuation of its movement displaces the slide and also feeds the blank forward, it is obvious that the feeding device ought to be of such a nature, that the blank always will be fed the definite length independent of any variation of the thickness of the blank and thus also independent of the blank having been clamped somewhat earlier or later. For this purpose the tension of the spring 39 in the link 34 is so adjusted, that the power necessary for the displacement of the slide is not great enough to compress the spring, in which case the pin 36 will remain in the position in the slot 35, shown in Figure 13 during the feeding of the blank. When the slide in feeding forward, which motion is very rapid, reaches its end position, which is determined by a plate 45 secured to the end of the plate 23, it has travelled a distance which is exactly equal to the distance the blank has to be fed forward, but then the member (the screw 41) which has displaced the slide, has not yet completed its movement in the feed direction, the remaining portion of its stroke being greater or smaller according as the blank having been clamped earlier or later in consequence of a variation in its thickness. When the screw 41 now passes the remaining portion of its stroke, but then cannot further displace the slide it will instead compress the spring 39, when the pin 36 will move in the slot 35. At this final moment the lever 37 will have the position shown in Figure 13 with dash and dot lines.

When the slide is returned to its original position, which can be done at a less speed than for the forward movement, the screw 42 acts on the lever 37. As the link 34 is then subjected to a pulling action, the pin 36 is at first moved back in the slot 35 whereupon the bell crank lever arm 32 is rocked on its pin 31, when the pressure of the corner 44 against the plate 40 ceases, in consequence whereof this latter will be lifted out of contact with the blank by the springs 43. In order then to prevent the bell crank lever again pressing down the plate 40 against the blank the end of its other arm 46 on each side is provided with a lug 47, which lugs strike against shoulders one on each of the ears 30, whereby the arm 46 is prevented from descending to the plate 40. When the parts are in the positions now mentioned the blank is free between the plate 40 and the slide. Owing to the friction that has to be overcome in order to move the slide, this latter can evidently not be moved before the blank is free and this latter can evidently not be clamped during the return stroke of the slide. In order that the slide during the return stroke may stop at a certain place only an accurate adjustment of the screw 42 is necessary.

Having passed the feeding device each blank is fed to its cutting device D, D' respectively. Of these the device D is shown in side elevation in Figure 3, and on an enlarged scale, partly in longitudinal section, in Figure 5. It consists of a casing 48 and may be adjusted side-ways with the aid of a plate 49 provided with suitable adjusting screws so as to be brought in desired position below the corresponding carrier E, which together with the other carrier E' is adapted to unite one button part to the other. In the casing 48 are arranged three concentric slides 50, 51 and 52 which are movable in their longitudinal directions and which all in the starting position have their upper ends below a chamber 53 in the upper part of the casing 48, through which the blank A is fed and which is of the same width as the blank. The slide 50, which is fitted into the casing 48 and guided in the same, is at its upper end provided with a tubular member 54 the upper end of which is of the same diameter as the upper button part which has to be cut out of the blank. The upper end of the member 54 enters into and is guided in a corresponding opening in the upper end of the casing 48 and reaches up to the bottom of the chamber 53. Above the chamber 53 is a ring 55 the inner diameter of which is equal to the outer diameter of the member 54 and against which rests another ring 56, the inner diameter of which is less than the inner diameter of the ring 55 and which is retained in its place by some suitable threaded ring 57. The slide 51 is movable in the slide 50 and is at its upper end also provided with a tubular member 58 (see also Figures 25 and 26), the upper end of which is guided in the member 54 and is extending up to about the same level as this latter and is adapted to enter into the ring 56. Inside the member 58 is mounted the slide 52, which is in the form of a rod (see also Figures 27 and 28) and which also is extending up to about the same level as the other two slides. All the slides 50, 51 and 52 are displaceable the one independent of the other and are for that purpose actuated at their lower ends. Thus the slide 51 extends (see Figure 3) below the lower end of the slide 50 and the slide 52 below the lower end of the slide 51. In order to move the slides the slide 50 at the lower end is provided with two pins 59 (Figure 3) placed on diametrically opposite sides of the slide, and the slide 51 also provided at the lower end with two pins 60 placed in the same way. The two slides 50 and 51 are moved in the direction upwards as well as downwards each by its lever which at its end is provided with a fork for the pins 59, 60 respectively, while the third slide 52 is moved only in the direction upwards by a lever acting upon its end and is returned downwards by a spiral spring 61 (Figure 5).

The cutting device D, D' respectively is so positioned in relation to the embossing device B, B' respectively, that, while the blank is at rest between two feeding movements and it is subjected to the action of the embossing device, an embossed portion in the blank is centrally placed in cutting device and these subjected to the action of all the slides at the same time as the blank is subjected to the action of the dies in the embossing device, so that, when the blank after the action in the embossing device is again ready to be fed forwards, also all the slides in the cutting device have done their work and returned to their lower positions, having their upper ends below the chamber 53 for the blank, in order that this latter again may be fed forward. As soon as a button part in the blank after the feeding forward is in position in the chamber 53 the member 54 on the slide 50 enters into the ring 55 when the button part is cut out and free from the blank. Immediately hereupon and almost simultaneously herewith rises the member 58 on the slide 51 as well as the rod 52, when two pins 62 on the upper end of the member 58 and two pins 63 on the upper end of the rod 52 enter into the four sewing holes in the button part, whereby the position of this latter, which now is severed from the blank, can not be changed in any other way than vertically by being displaced either by the slide 51 or the rod 52. The two pins 62 are carried by a cross piece 64 (Figures 25 and 26) placed in the upper end of the tubular member 58, while the upper end of the rod 52 is provided with a longitudinal slit 65 of such a width, that the cross piece 64 may move in the same, and of such a length, that the rod may be displaced so far upwards, that the pins 63, of which there is one on each side of the slit, may rise sufficiently above the pins 62, as further described below. When the button part has been severed from the blank it rests on the upper end of the member 58 as well as of the rod 52, which are now level with each other, and with the four pins 62 and 63 placed into the sewing holes in the button part. While the button part is kept in this way the slide 51 with the member 58 and the rod 52 rise simultaneously and with the same speed and enter into the ring 56, the inner diameter of which is less than the inner diameter of the ring 55 (and thus less than the diameter of the button part which is equal to the diameter of the ring 55), whereby the button part round the whole circumference is provided with a turned down flange. When this flange has been made and the button part has risen sufficiently high in the ring 56, the slide 51 with the member 58 returns to its lower position while the rod 52 is further displaced upwards, when only the two pins 63 remain in their sewing holes of the button part and both the other holes are empty. The rod 52 now continues its movement upwards with the button part, until this latter reaches the downward projecting end of the carrier E, which is so positioned, that two pins 66 (see also Figure 4) on the end of the same enter into the empty holes just mentioned, which the pins 62 just have left. As soon as the button part is in its new position on the end of the carrier the rod 52 is returned to its original lower position by the spring 61. In order that the button part then may remain on the pins 66 and not accompany the rod 52 downwards, each of the pins 66 is provided with a longitudinal groove, wherein is placed a spring 67 (Figure 21) the end of which extends almost to the point of the pin and which is bent in an outwardly projecting curve, the highest point of which is at about the middle of the length of the pin. When the button part is moved upwards and said pins enter into the holes the springs are depressed into their grooves, when the button part passes the curve of the spring, whereafter the spring resumes its prior form when the curve of the spring prevents the button part to accompany the rod 52, when this is moving downwards.

The cutting device D' in which the lower button part is cut out from the blank A', is in all essentials like the cutting device D just described, in which case it is not considered necessary to describe the same. It may be sufficient to mention that the lower button part after having been cut out and severed from the blank is not, like the upper button part, provided with a flange all around, but immediately after having been cut out, when it, like the upper button part, is on the upper end of a slide or rod provided with pins (Figures 29 and 30) entering into the sewing holes, is moved upwards towards the downwardly projecting end of the carrier E'. In order that the lower button part, which has the form of a cup or a spherical segment of about the form shown in Figure 37, may be retained by the carrier and not return to the cutting device, the carrier E' is provided with a special catching device in which the button part is introduced and kept when moved upwards from the cutting device.

The frame for the carrier E' consists of a casing 68 (Figure 4) wherein is arranged a slide 69, kept in raised position by a spiral spring 70 placed inside the casing around the slide. To the lower end of the slide 69 are rotatably connected three hooks 71 (see also Figures 22 to 24), each of which being actuated by a spring 72 which pushes the free end of the hook inwards towards the center of the slide. The inner edge of each hook has at the lower end the form of a curve extending from the free point of the hook a distance upwards and forming at a suitable distance from the point a notch 73. The hooks are so positioned that, when being free and only actuated by their springs, the points of the same are on the circumference of a circle, the diameter of which is somewhat greater than the diameter of the lower button part, while the bottoms of the notches 73 are on the circumference of a circle, the diameter of which is somewhat less than the diameter of the button part. When thus the button part is moved upwards from the cutting device D' it enters inside the points of the hooks and will immediately thereupon come in contact with the curve extending from the point of each hook when the hooks against the pressure of the springs are turned outwards until the button part with its circumference enters into the notches 73. As soon as this occurs the slide that has lifted the button part returns to its original lower position, the button part being kept in the notches 73 by the springs 72.

The introduction of the lower button part between the hooks 71 occurs simultaneously with the attaching of the upper button part on the pins 66. As soon as the button parts have been so placed they are in the required positions to be united, and in order that this may be done the two carriers E and E' are turned a quarter of a revolution each so as to take the positions shown in dash and dot lines in Figure 4. In order to effect said rotation the casing of each carrier E and E' is provided with a pivot 74 (see also Figures 5 and 18), which is mounted in a bearing in the machine frame and to which is secured a pinion 75. Between these pinions is in the machine frame arranged a slide 76, each of the opposite edges of which carries a rack 77 the teeth of which are in engagement with the teeth in its adjacent pinion 75. Each rack is placed in a recess in the edge of the slide and is connected with the same by means of two bolts 78 passing through elongated openings 79 in the slide, so that the rack will have some freedom to move longitudinally in the one as well as the other direction. The recess being of a greater length than the rack the latter is kept in a middle position in the recess by a spring 80 at each end of the rack, wherein is provided a cavity for the spring, which has its outer projecting end abutting against the shoulder formed by the recess in the slide, as shown in Figure 18. These springs possess sufficient tension to maintain each of the racks in its middle position during that part of the stroke by which the pinion 75 is rotated to move the carrier E, E' respectively from the one position to the other. These positions are, however, very accurately determined and as the change of position must take place very rapidly the rotation of the carriers must evidently be positively stopped when rotated. In order that each carrier when rotated with certainty may be stopped in its end position and then securely kept in that position it is of advantage, that the stroke of the slide in each direction is somewhat in excess of the length actually required, but in order that the teeth, that are in engagement with each other, may not be broken each rack 77 is yieldingly connected with the slide. The rotation of the carrier E, E' respectively, in the one direction is limited by a lug 81 carried by the slide above each rack, while the rotation in the other direction is limited by a lug 82 (Figure 4), which preferably is adjustable and is carried by the machine frame.

When in the horizontal positions shown with dash and dot lines in Figure 4 the carriers rest on and are by the springs 80 at the lower ends of the racks 77 pressed hard against the lugs 82, the outer end of the carrier E being then close to a slide 83 and the outer end of the carrier E' close to a slide 84. These slides (see also Figures 1 and 2) are guided in the machine frame and are movable in the longitudinal direction of the carriers E, E', when these are in their horizontal positions, each of the slides being actuated by a lever 85, 86 carried by the machine frame. As soon as the carriers have arrived in their horizontal positions the slide 84 will first be actuated by the lever 86, whereby the slide 69 in the carrier E' will be moved towards the carrier E and the lower button part, which is carried by the hooks 71, thus moved towards the upper button part carried by the pins 66. While the one button part thus is approaching the other the pins 66 will first enter into the corresponding holes in the lower button part, so that all the sewing holes in both the button parts will be accurately opposite each other in the ready made button, and immediately thereupon the points of the hooks 71 will come in contact with the member 87 carrying the pins 66. Said member 87 is conical and has the surface, against which the button part rests, of the same diameter as this latter, whereby the hooks 71 at the further advancement of the slide 69 will slide upon the conical member 87 thereby disengaging the hooks from the button part, so that this latter hereafter will be kept only by the pins 66, which now carry both the button parts. The lower button part is now brought nearer the upper one by the end of the slide 69, which is provided partly with holes for the pins 66 and partly with a cup-shaped recess 88 corresponding to the shape of the lower button part and finally enters inside of the flange of the upper button part. At the time the lower button part is well pressed against the upper one the flange of this latter one comes in contact with the cup-shaped surface in the recess 88, which turns said flange over the edge of the lower button part, whereafter both button parts are united the one with the other and the button is completed. At this moment the parts of the device and the completed button are in the positions, shown in Figure 35.

Immediately after the button is completed the lever 86 is removed from the slide 84 and the latter from the slide 69 where, the spring 70 moves the slide 69 back to its original position, when the hooks 71 leave the conical member 87 (see Figure 35) without touching the completed button on the pins 66. As soon as the slide 69 and the hooks 71 have left the button the slide 83 is moved by the lever 85 towards the carrier E, whereby a rod 89, which is centrally mounted in the carrier and the end of which extends to the completed button, will be displaced such a distance by the slide 83, that the button is pushed away from the pins 66 and permitted to drop out from the machine. The slide 83 and the lever 85 will immediately thereupon return to their prior positions while the rod 89 will be returned to its original position by a spring 90. When the slides 83 and 84 have completed their strokes forwards and backwards in order to effect the union of the both button parts as well as the removal of the completed button from the machine, the slide 76 immediately descends into its lower position thereby rotating both the carriers E and E' until these latter come in contact with the lugs 81, against which they are well kept by the springs 80 at the upper ends of the racks 77. The carriers being again in their upright positions, shown in full lines in Figure 4, they are again ready to receive a button part each, as above described.

As will be seen from the above both the carriers E, E' remain immovable in their upright positions until they have received a button part each, but immediately thereafter they are simultaneously rotated until they arrive in horizontal positions when their ends, which previously were projecting downwards, will be facing each other. In these positions the carrier E, which carries the upper button part, forms the stationary support, against which the slide 69 in the carrier E', which carries the lower button part, is pressed in order that the button parts may be united to a button which as such is removed from the carrier E. While the button parts are united the one to the other and especially at the moment when one button part is moved towards the other, it is evidently of great importance, that the accurate adjustment of the carriers E, E', which is required in order that the lower button part may entirely come inside the flange of the upper button part, is not in any way altered by those parts which during the completion of the button have to be in motion. For that reason the member, that directly actuates the slide 69, receives the slide 69 and is also in the form of a slide (the slide 84) guided in the machine frame and having its direction of movement parallel with the direction of movement of the slide 69, so that the direction of movement of this latter can not be altered when actuated by the slide 84, even if the slide 69 were actuated by the end of a lever arm which is movable along an arc and not along a straight line. Each of the slides 83 and 84 is at the rear provided with a projection 91, 92 respectively, (Figure 2), to which is secured a rod 93, 94 respectively, acting as a guide for a spring 95, which pushes the slides 83 and 84 away from each other and from the carriers E and E' when the levers 85 and 86 return to their original positions.

When the button parts have been cut out from their blanks and these latter then fed further forwards, they pass out of their cutting devices and approach each the center of the machine, where they are to be removed as waste from the same. As a result each blank immediately after the exit of the cutting device enters between the jaws 96, 97 of the shears F (see Figure 6) arranged close to each cutting device. The one of these jaws 96 is stationary and the other formed on the end of a lever 98 which after each feeding forward of the blank is actuated and cuts the same. The remains of the blank are thus cut up in small pieces, which easily drop out of the machine and which may more easily be collected and also occupy less space than if the waste should come out of the machine in more or less greater lengths.

The devices used in driving the above described machine consist of such cams, levers, etc., as usually are used in driving the different parts of automatic machines and thus do not form any part of this invention, and therefore may be only briefly described.

With reference to Figures 1, 2 and 3, numerals 99 and 100 designate two shafts journalled in the machine frame and of which the one, 99, carries a driving pulley 101, which at any time may be thrown in engagement with and disengaged from the shaft by means of some suitable friction coupling or the like and a rod 102 with handle 103, connected with said coupling, while the other shaft 100 is driven from the shaft 99 by means of a chain 104 and sprocket wheels. Both the shafts rotate with the same speed and the chain is kept stretched by means of a roller 105. The shaft 99 imparts movement to the embossing devices B, B' and the carriers E, E', while the feeding devices C, C'; the cutting devices D, D' and the shears F are put in motion by the shaft 100.

Above each embossing device B, B' the shaft 99 carries an eccentric provided with a strap 106 which by means of a link 107 is connected to a slide 108, which is movable up and down and to which the plungers 1, 2, 3 and 11, 12, 13, appertaining to the embossing devices B, B', respectively, are detachably secured. Above the slide 76, actuating the carriers E, E', is a cam 109 secured to the shaft 99 and in contact with this cam is arranged a roller 110 vertically above the shaft and journalled between two side members 111 one on each side of the cam and connected to the slide 76. From said members 111 extends rearwardly a projection 112 connected with the one end of a spring 113 the other end of which is connected to the machine table and pulling the roller 110 towards the cam 109 and thus also the members 111 and the slide 76 downwards when this latter has been moved upwards by the cam. Each of the members 111 is fork-shaped and the distance between the two jaws of the member is equal to the diameter of the shaft 99, in consequence whereof this latter acts as a guide for the jaws in the plane of the cam, while the cam itself acts as a guide for the members in the longitudinal direction of the shaft 99. The movement up and down required to move the carriers E and E' from upright position to a horizontal position and vice versa is thus obtained by means of the cam 109 and the spring 113.

On the one side of the cam 109 the shaft 99 carries a cam 114 and on the other side a cam 115. These cams are actuating the levers 85 and 86, which with the aid of the slides 83 and 84 are acting upon the carriers E and E' in order to unite two button parts and to remove the ready made button from the machine. The levers 85 and 86 are actuated by the cams 114 and 115 only in one direction and are each by its spring 116 kept in constant contact with their slides. The pressure of the levers 85 and 86 on the slides 83 and 84 obtained by means of the springs 116 may not exceed the pressure of the spring 95 which pushes the slides away from each other.

The shaft 99 may with advantage be provided with a fly-wheel 117.

The shaft 100 is journalled in two bearings 118 secured to the rear part of the machine table. The ends of the shaft extend outside these bearings and near each end of the shaft and at a distance from each other are secured two cams 119 and 120, between which enters the one end of a lever 121, the other end of which carries the adjusting screws 41 and 42 (Figure 16) acting upon the forked lever 37. In order that the lever 121 may not be moved out of plane while acted upon by the cams 119 and 120 it rests near its end entering between the cams on a support 122, on which it slides when in movement.

On each side of its middle and between the two bearings 118 there is secured to the shaft 100 an eccentric provided with a strap 123 and two cams 124 and 125, which each by means of a lever 126, 127, 128 (see also Figure 6) is in connection with the pins 60 on the slide 51 the lower end of the slide 52 and the pins 59 on the slide 50 in the cutting device D, D' respectively. Of these levers each of the levers 126 is evidently moved upwards as well as downwards by its eccentric while the two other levers are kept in contact with their cams each by its spring 129 and 130, so that each of these levers is moved in the one direction by its cam and in the other direction of the spring acting upon the same.

The shaft 100 is provided with another cam 131 secured to the middle of the shaft and acting upon the one end of a lever 132, kept in contact with the cam by means of a spring 133 while the other end of the lever on each side is provided with two projections or pins 134 the one some distance above the other. On each side of the lever 132 entering between the pins 134 is the rear end of the lever 98 the front end of which consists of the movable jaw in the shears F for cutting the blanks A, A' respectively when this as waste leaves the cutting device D, D' respectively.

It will easily be seen that buttons of any desired shape and size composed of one upper and one lower part as above described, may be manufactured on this machine and then provided with any desired impress or stamp. Changes in the different details of the machine desired to be made for the manufacture of any special kind of button may easily be effected by any one having knowledge in the art and need not be further described.

It is to be understood that the invention is not limited to the particular details of construction or arrangement which have been shown for the sake of illustration but include modifications which fall within the scope of the appended claims.

Having now described my invention what I claim as new and desire to secure by Letters Patent is:

1. A machine for an entirely automatic manufacture of buttons composed of one upper part and one lower part including a frame having two pathways leading to a common place of the machine and adapted for guiding two blanks, an embossing device arranged in each of the pathways for shaping and piercing the button parts in the blanks, a feeding device for each blank, a cutting device for each blank in which the button part is severed from the blank, a rotatable carrier associated with each cutting device for receiving the severed button part from the cutting device, means for oscillating the carriers so that the members of the carriers which face the blanks and receive the button parts from the blanks move the button parts into a position in which they face each other and means associated with the carriers, when the members thereof face each other, for uniting the button parts, said oscillating means turning each carrier in the opposite direction to its normal position in order to receive the next button part.

2. A machine according to claim 1, wherein a main carrier actuating slide is mounted in the frame of the machine and is common to both carriers, the carriers being placed near each edge of the slide, two racks on said slide, a pinion on the pivot of the adjacent carrier and in engagement with the corresponding rack so that when the slide is displaced in one direction both carriers are simultaneously moved from their position for receiving the button parts to their position for uniting these parts and when the slide is displaced in the other direction the carriers are returned to their normal position.

3. A machine for an entirely automatic manufacture of buttons of the type described including a frame having two pathways leading to a common point in the machine and adapted for guiding two blanks, an embossing device arranged in each of the pathways for shaping the button parts in the blanks, a feeding device for each blank, a cutting device for each blank by means of which the button parts are severed from the blanks, a pivotally mounted carrier including a button receiving member associated with each cutting device for receiving the severed button parts from the corresponding cutting device, a slide mounted in the frame and between the carriers and common to both carriers, two racks on the slide, a pinion on the pivot of the adjacent carrier and in engagement with the corresponding rack so that when the slide is displaced in one direction both carriers are simultaneously moved from their position for receiving the button parts to their position for uniting the button parts and when the slide is displaced in the other direction the carriers are returned to their normal position.

4. A machine according to claim 3, wherein each rack is displaceably connected to the slide while two springs, acting in opposite directions, keep the rack in its middle position on the slide so that when the slide is displaced at a distance beyond the stroke that is required for moving the carrier the latter will be securely held when stopped in either of its positions.

5. A machine according to claim 3, wherein lugs are provided on the slide and on the frame so that each carrier when moved into one position strikes against the lug on the slide and when moved into its other position strikes against the lug on the frame.

6. A machine according to claim 3, wherein one carrier has its end, facing the cutting device, of a conical configuration the narrow end of which is provided with pins corresponding to the sewing holes in the button part and adapted to retain said button part, and spring actuated hooks on the other carrier at the end facing the cutting device and between which hooks the button part pushed out from the cutting device is retained.

7. A machine according to claim 3, wherein one carrier has its end, facing the cutting device, of a conical configuration the narrow end of which is provided with pins corresponding to the sewing holes in the button part and adapted to retain said button part, and spring actuated hooks on the other carrier at the end facing the cutting device and between which hooks the button part pushed out from the cutting device is retained, another slide displaceable in the last mentioned carrier having one end connected with the hooks while the other end, at the time the button parts face each other, is positioned so as to be actuated by the slide movable in the machine frame so that when the last named slide is displaced the button part carried thereby will be moved towards and united with the button part carried by the opposite carrier.

8. A machine according to claim 3, wherein one carrier has its end, facing the cutting device, of a conical configuration the narrow end of which is provided with pins corresponding to the sewing holes in the button part and adapted to retain said button part, and spring actuated hooks on the other carrier at the end facing the cutting device and between which hooks the button part pushed out from the cutting device is retained, another slide displaceable in the last mentioned carrier having one end connected with the hooks while the other end, at the time the button parts face each other, is positioned so as to be actuated and moved by a slide mounted in the machine frame, said hooks extending beyond that place where the button part is retained between the same and having the outer ends bevelled, so that, when the carrier slide is moved towards the other carrier, the hooks then slide on the conical portion of said carrier and at the same time transfer the button part to the pins of the same, while the button parts are united the one to the other and the completed button is left on the said pins.

In witness whereof I have hereunto set my hand.

J. ALFRED BLADH.